United States Patent
Parkkila (12)

(10) Patent No.: US 6,223,037 B1
(45) Date of Patent: Apr. 24, 2001

(54) CELL SELECTION DURING LOSS OF SERVICE IN A TELECOMMUNICATIONS SYSTEM

(75) Inventor: Pasi Parkkila, Dallas, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/169,778

(22) Filed: Oct. 9, 1998

(51) Int. Cl.[7] ............................. H04Q 7/20; H04B 7/00; H04B 1/18
(52) U.S. Cl. .................. 455/434; 455/515; 455/161.3
(58) Field of Search ..................... 455/67.1, 434, 455/62, 515, 161.1, 161.2, 161.3

(56) References Cited

U.S. PATENT DOCUMENTS 5,974,328 * 10/1999 Lee et al. ........................... 455/456
6,041,218 * 3/2000 Kudoh ............................. 455/38.4

* cited by examiner

Primary Examiner—William G. Trost
Assistant Examiner—Sheila Smith
(74) Attorney, Agent, or Firm—Brian T. Rivers

(57) ABSTRACT

Cell selection during loss of service from a selected network includes maintaining a measurement link with a channel of at least one cell of the selected network while also initiating a broader search on channels of cells of other networks or channels of the selected network not included in maintaining the measurement link. Maintaining the measurement link allows service to be re-established more efficiently if the mobile station is again immediately in a coverage area of the selected network after loss of service occurs. In an embodiment, when a cell reselection process detects a loss of service from a selected network, the mobile station maintains the measurement link by continuing to perform measurement on and synchronizing to at least one channel of the selected network to determine if service can be eventually re-established with a suitable cell of the selected network, even though service has been lost and no cell has been, or may be, reselected from the immediate measurement results.

14 Claims, 2 Drawing Sheets

CELL SELECTION DURING LOSS OF SERVICE IN A TELECOMMUNICATIONS SYSTEM

FIELD OF THE INVENTION

This invention relates to an improved method and apparatus for selecting a serving cell for a mobile station after loss of service from a serving network in a telecommunications system and, more particularly, to a method and apparatus for selecting a serving cell, wherein a measurement link is maintained between the mobile station and the serving network after loss of service, to provide more efficient re-establishment of service.

BACKGROUND OF THE INVENTION

Cellular telecommunications systems operating according to some form or variation of the European Telecommunications Standards Institute (ETSI) Global System for Mobile Communications (GSM) standard are prevalent worldwide. Those systems include standard GSM systems operating in the 900 MHz frequency band, personal communications systems (PCS) operating in the 1900 MHz frequency band, and Digital Communication Systems (DCS) operating in the 1800 MHz frequency band.

In a system operating according to the GSM standard, when a mobile station operating in idle mode loses service and can no longer locate an acceptable serving cell using the GSM cell reselection procedure within the serving network, a process is initiated whereby the mobile station begins to search for a new serving cell or serving network on a broader basis. The new serving cell that is sought may be in the network from which service was lost or in a separate network. The search procedure used upon loss of service is the same procedure used for establishing service initially. This procedure includes the public land mobile network (PLMN) and cell selection procedures specified in Section 6 of the ETSI document GSM 05.08 Version 6.20, TS 100 911 V 6. 20 (1998-07) and Sections 4.4 and 4.5 of the ETSI document GSM 03.22 Version 6.0.0 IS 100 930 V6.0.0 (1998-07).

The loss of service procedures specified for GSM assume that when loss of service occurs, a mobile station has moved away from the serving network and cells of the serving network available for reselection immediately prior to loss of service will no longer be available for reselection after loss of service. The procedure, therefore, begins to initialize service with a network search. The network search involves locating a network and searching, through the GSM cell selection process, all RF channels of the system in which the selected network is included. This involves searching up to 124 channels for GSM 900 MHz systems, 299 channels for GSM 1900 MHz (PCS 1900) systems, and up to 374 channels for GSM 1800 MHz systems (DCS 1800). It is also possible to specify a fewer number of channels to be searched in cell selection through the use of stored lists in the mobile station.

The assumption that the mobile station has moved away from the serving network, however, is not always correct, and using this loss of service procedure may cause problems or inefficiencies in mobile station operation. When loss of service is encountered, the PLMN and cell selection procedures will be initiated within the mobile station and the PLMN and/or cell selection procedures will be performed even though the mobile station may still be located in the service area of the former serving network, and strong signals are immediately again available to the mobile station from the former serving network. Continually initiating the PLMN and/or cell selection procedures could be inefficient.

For example, a mobile station may be located in a serving network where signals from all serving network cells being considered for reselection may be temporarily weakened, or blocked, as the user of a mobile station moves through certain areas of the serving network. In this type of situation, if all the signal strengths from candidate cells for reselection fall below a threshold level C1, loss of service from the serving network is assumed. The loss of service may happen over and over again. The actual loss of service also could be very short in duration if the weakening or blocking of the signals of the candidate cells happens for only a very short period of time, as, for example, if the user of a mobile station rapidly drives through a tunnel or moves rapidly among or within buildings. In this case, the signal strength of one or more candidate cells of the serving network may quickly rise again above the threshold level C1 after loss of service. However, even though these cells of the serving network are available again, the mobile station will initiate a network search. The network search will eventually bring the mobile station back to the former serving network.

Because performing the PLMN and cell selection procedures consume significant power, it is common to implement a power saving mode for PLMN and cell selection for GSM. In the power-saving mode, a mobile station typically repeats the PLMN and cell selection procedures every x seconds, rather than repeating the process continuously. X may be, for example, a value of 6 seconds. This power-saving mode could have negative effects as far as time to re-establish service in areas where network coverage is poor and the user of a mobile station is rapidly moving. In this case, a significant percentage of time may be spent performing the PLMN and/or cell selection procedures when the mobile station will only end up back on the former serving network. As the total percentage of time spent on PLMN and cell selection rises, the less time the mobile station indicates available service to the user. Also, there will be less overall time during which the user will be able to receive calls.

OBJECTS OF THE INVENTION

It is, therefore, an object of the invention to provide a method and apparatus for selecting a serving cell for a mobile station during loss of service in a telecommunications system that overcomes the foregoing and other problems.

It is a further object of the invention to provide a method and apparatus for selecting a serving cell for a mobile station during loss of service that reduces the overall time spent selecting a serving cell and increases the overall time in available service.

It is still a further object of the invention to provide a method and apparatus for selecting a serving cell for a mobile station, wherein unnecessary searches for a new network and unnecessary cell selection performed to locate new cells are prevented when the mobile station is again immediately within the service area of a former serving network after loss of service from that former serving network.

SUMMARY OF THE INVENTION

The foregoing and other problems are overcome, and the objects of the invention are realized by methods and apparatus in accordance with embodiments of the invention.

A method and apparatus of the invention is disclosed for selecting a serving cell for a mobile station during loss of service in a telecommunications system. Cell selection during loss of service from a selected network includes maintaining a measurement link with a channel of at least one cell of the selected network while also initiating a broader search on channels of cells of other networks or channels of the selected network not included in maintaining the measurement link. Maintaining the measurement link allows service to be re-established more efficiently if the mobile station is again immediately in a coverage area of the selected network after loss of service occurs.

In an embodiment, when a cell reselection process detects a loss of service from a selected network, the mobile station maintains a measurement link by continuing to perform measurement on and synchronizing to at least one channel of the selected network to determine if service can be eventually re-established with a suitable cell of the selected network, even though service has been lost and no cell has been, or may be, reselected from the immediate measurement results. In the embodiment, the measurement may be performed in the same manner as measurements for cell reselection are performed during service. The loss of service from the selected network may be detected when the received signal strength levels of the signals received from all candidate cells for reselection of the selected network fall below a threshold level. Even though no cell presently provides a signal above the threshold level, the measurement link with the selected network may be maintained by continuing measurement and synchronization on channels of the selected network or done for the cell reselection process. Simultaneously with maintaining the measurement link with the selected network, a network search process is initiated to determine if a suitable cell to provide service can be found from cells of another network or cells of the selected network not measured in the measurements. The measurements to maintain the measurement link may be made so that there is minimum time between each set of measurements, keeping the measurement link up to date by at least that minimum time.

The search process and cell reselection measurement process may be performed interleaved in time. The measurement process for maintaining the measurement link with the selected network may be continued on each channel of the selected network for which the received signal strength remains above a minimum level and may be performed during periods when the network search process is in a power-saving mode and timed out. The minimum level may be determined according to the sensitivity of the mobile station receiver. If the measurement process indicates that the received signal level from a cell of the selected network has risen again above the service threshold level, service will be established with the selected network; otherwise a suitable cell not included in the network measurement process or a suitable cell of another network is eventually located through the network search.

DETAILED DESCRIPTION OF THE INVENTION

Figure 1:
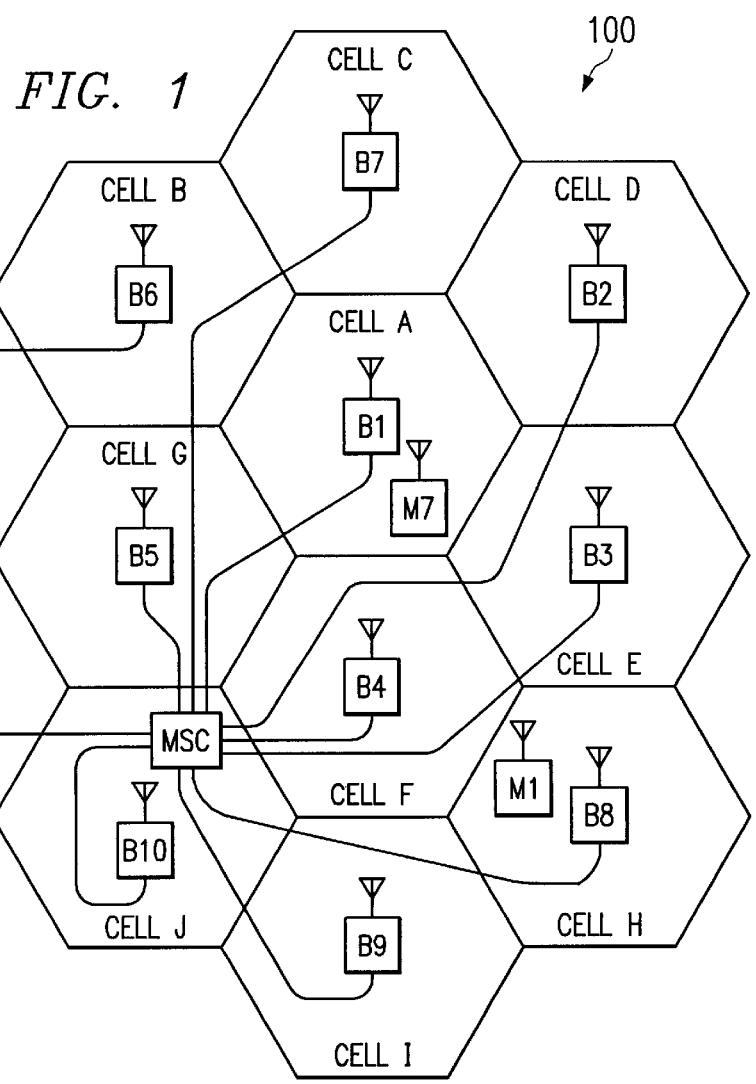
FIG. 1 shows portions of a cellular telecommunications network to which the present invention generally pertains.

Referring now to FIG. 1, therein is shown a portion of a cellular radio communication network of the type to which the present invention generally pertains. In FIG. 1, an arbitrary geographic area may be divided into a plurality of contiguous radio coverage areas, or cells Cell A–Cell J. While the system of FIG. 1 is illustratively shown to include only ten cells, it should be clearly understood that in practice the number of cells may be much larger.

Associated with, and located within, each of Cell A–Cell J is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of Cell A–Cell J, respectively, and are equipped with omnidirectional antennas. However, in other configurations of the cellular radio system, the base stations B1–B10 may be located near the periphery or otherwise away from the center of Cell A–Cell J and may illuminate Cell A–Cell J with radio signals either omnidirectionally or directionally. Therefore, the representation of the cellular radio system of FIG. 1 is for purposes of illustration only and is not intended as a limitation on the possible implementations of the cellular radio system within which the present invention is implemented With continuing reference to FIG. 1, a mobile station M1 may be found within Cell A–Cell J. Mobile station M1 includes a transmitter, a receiver, and a mobile station controller as are well known in the art. Only one mobile station is shown in FIG. 1, but it should be understood that the actual number of mobile stations may be much larger in practice and will invariably greatly exceed the number of base stations. Mobile station M1 may roam from one location in the cell to another or from one cell to an adjacent cell or neighboring cell, and even from one cellular radio system to another such system.

Mobile station M1 is capable of initiating or receiving a telephone call through one or more of the base stations B1–B10 and a mobile station switching center (MSC). The mobile station switching center (MSC) is connected by communication links, e.g., cables, to each of the illustrative base stations B1–B10 and to the fixed public switched telephone network (PSTN), not shown, or a similar fixed network which may include an integrated services digital network (ISDN) facility. The relevant connections between the mobile station switching center (MSC) and the base stations B1–B10 or between the mobile station switching center (MSC) and the PSTN or ISDN are not completely shown in FIG. 1 but are well known to those of ordinary skill in the art. Similarly, it is also known to include more than one mobile station switching center in a cellular radio system and to connect each additional mobile station switching center to a different group of base stations and to other mobile station switching centers via cable or radio links.

The MSC may control the administration of communication between each of the base stations B1–B10 and the mobile station M1 in communication with it. As a mobile station roams about the system, the mobile station registers its location with the system through the base stations that control the area in which the mobile station is located. When the mobile station telecommunications system receives a call addressed to a particular mobile station, a paging message addressed to that mobile station is broadcast on control channels of the base stations which control the area in which the mobile station is believed to be located. Upon receiving the paging message addressed to it, the mobile station sends a page response to the base station. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A–Cell J is allocated a plurality of voice or speech channels and at least one control channel, such as a digital broadcast control channel (BCCH). In the embodiment of the invention, each of Cell A–Cell J in network 100 is assigned a broadcast control channel (BCCH), common control channel (CCCH), access grant channel (AGCH), random access control channel (RACH), frequency correction channel (FCCH), and synchronization channel (SCH). The digital channels are transmitted from the base station at each cell on the same frequency channel, known as the "BCCH carrier." The control channels carried on the BCCH carrier are used to control or supervise the operation of mobile stations by means of information transmitted to the mobile stations. Such information may include call originations, page signals, page response signals, location registration signals and voice channel assignments.

Figure 2:
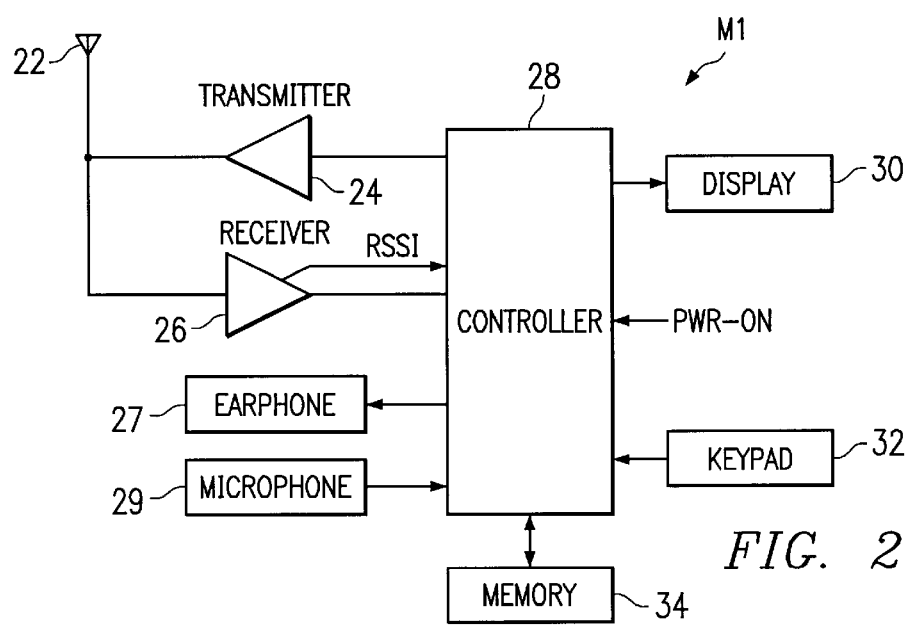
FIG. 2 is a block diagram of portions of a mobile station for performing cell reselection after loss of service according to an embodiment of the invention.

Referring now to FIG. 2, therein is a block diagram of a mobile station M1 that is constructed and operated in accordance with this invention. Mobile station M1 may be implemented as mobile station M1 of FIG. 1. Mobile station M1 includes an antenna 22 for transmitting signals to and receiving signals from a base station, such as base stations B1–B10 of the cellular system of FIG. 1. Mobile station M1 includes a transmitter 24, a receiver 26, and a controller 28. Controller 28 provides control signals to transmitter 24 and receiver 26 and also receives signals from receiver 26 and inputs signals to transmitter 24 for transmission to the network. These signals include signaling information in accordance with the air interface of the cellular system and also user and/or user-generated data. Receiver 26 also includes circuitry capable of measuring signal strength on received signals and sending a received signal strength indication (rssi) signal to controller 28.

A user interface includes a conventional earphone 27, a conventional microphone 29, a display 30, and a user input device, typically a keypad 32, each of which is coupled to controller 28. Mobile station M1 also includes various memories, shown collectively as memory 34, wherein are stored a plurality of constants and variables that are used by the controller 28 during the operation of mobile station M1. For example, memory 34 stores the values of various cellular system parameters and the subscriber identity module (SIM). An operating program for controlling the operation of controller 28 is also stored in memory 34 (typically in a ROM device). The operating program includes routines and procedures for controlling transitioning of mobile station M1 between control channels according to the invention. Memory 34 also stores data, including messages that are received from a cellular network prior to processing of the messages by controller 28.

It should be understood that mobile station M1 can be capable of operating with one or more air interface standards, modulation types, and access types. For example, mobile station M1 may be capable of operating in accordance with the GSM or GSM-based PCS1900 or DCS 1800 standard. Mobile station M1 may also be capable of operating with any of a number of other multi mode analog/digital or single mode digital standards that utilize control channels, such as the TIA/EIA IS-136 dual mode standard, in which the frequency modulated (FM), frequency division multiple access (FDMA) transmission and reception of TIA/EIA-553 (AMPS) is used for analog mode, and the time division multiplexing (TDMA) transmission and reception of IS-136 is used for digital mode. In general, the teaching of this invention applies to any mobile station that operates within a cellular system having multiple control channels that are searched for reselection, such as ACCHs, DCCHs or BCCHs, where they may be assigned to particular cells of the system. It should also be clear that the teaching of this invention is not to be construed to be limited to any one particular type of mobile station or air interface standard, or any particular types of control channels.

In an embodiment of the invention, the method and system is implemented into a cellular system similar to that shown in FIG. 1, which operates according to a GSM-type standard. In the embodiment, the operating program in memory 34 includes routines for selecting a cell after loss of service for operation of mobile station M1 in a cellular network such as cellular network 100 of FIG. 1 according to the embodiment of the invention. This includes routines for implementing the method described below in relation to FIG. 3. The embodiment of the invention may be implemented through and used in conjunction with known processes for GSM-type public land mobile network (PLMN) search and cell selection and reselection. This allows efficient implementation of the embodiment into a GSM-type system.

When mobile station M1 is powered on but not involved in a call on a traffic channel, it will move to idle mode while in the network of FIG. 1. To initiate idle mode, upon power-on or upon moving into network 100, mobile station M1 will always attempt to locate the most suitable BCCH carrier that is available through the public land mobile network (PLMN) search and cell selection procedures specified in the GSM documents, "GSM 05.08 Version 6.2.0 TS 100 911 V6.2.0 (1998-07) and GSM 03.22 Version 6.0.0 TS 100 930 V6.0.0 (1998-07). These documents are hereby incorporated herein by reference. Mobile station M1 performs measurement searches on BCCH carriers transmitted from the base stations of a "suitable cell," that is, a cell that is not barred for some reason, that is not forbidden to mobile station M1 for roaming, and in which the path loss between mobile station M1 and the relevant base station is below a threshold, C1, set by the network operator. The threshold level may be transmitted to mobile station M1 over a previously serving BCCH carrier. In the situation shown in FIG. 1, mobile station M1 will identify the BCCH carrier transmitted from base station B8 as the strongest received BCCH carrier and determine Cell H of network 100 as the suitable cell.

When a suitable cell is located, mobile station M1 tunes to the BCCH carrier of that cell, "camps on the cell," so that it may receive system information and paging messages from the network on the control channel of the BCCH carrier. When camped on a cell, the mobile station M1 regularly looks to determine if there is a better cell in terms of reselection criteria and, if there is, the better cell is selected. In the cell reselection process the mobile station measures received signal strength on cells neighboring the cell on which the mobile station is camped. If a neighboring cell provides a better signal in terms of path loss, the mobile station selects the neighboring cell and camps on that cell. (This is called "cell reselection.") In order to speed up the reselection process, a list of the channels (BA) including BCCH carriers for the relevant geographic area of the network is broadcast on the camped-on BCCH carrier. The BCCH carriers in the BA are used in the reselection measurement process. In the embodiment of the invention, this reselection is performed according to the GSM document, GSM 03.22 Version 6.0.0 TS 100 930 V6.0.0 (1998-07).

Figure 3:
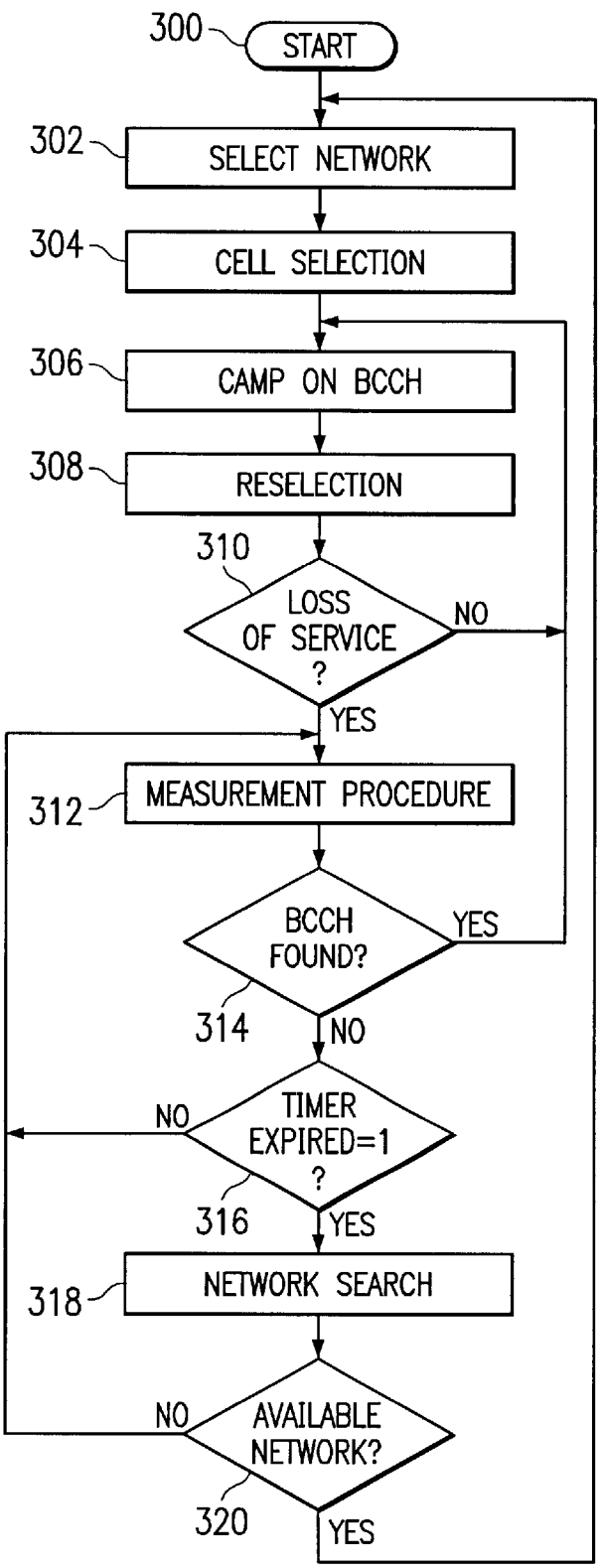
FIG. 3 is a flow diagram showing process steps used when performing cell reselection after loss of service according to an embodiment of the invention.

Referring now to FIG. 3, therein is a flow diagram showing process steps used when performing cell reselection after loss of service according to an embodiment of the invention. The process of FIG. 3 can be described in conjunction with FIG. 1 and FIG. 2 and an example using hypothetical movement of M1 within the network of FIG. 1. The process steps of FIG. 3 may be carried out within the circuitry of mobile station M1, as controlled by controller 28, according to routines and information stored in memory 34.

The process begins at step 300 as mobile station M1 is powered on within network 100. After power-up, at steps 302–308, mobile station M1 selects a network, selects a cell within the selected network, camps on the BCCH carrier of the selected cell, and performs reselection of BCCH carriers in the selected network. In the example of FIG. 1, M1 will select network 100, select Cell H, register on the BCCH carrier of Cell H and perform reselection on the BCCH carriers included in the neighbor list (BA) received over the BCCH carrier of Cell H. In reselection, mobile station M1 determines and maintains an average received level for all BCCH carriers in the BA. Mobile station M1 also measures the 6 strongest BCCH carriers, synchronizes to these 6 BCCH carriers, and decodes the BCCH carrier data block from each of these 6 BCCH carriers. The process may remain in the loop of repeating steps 302–310, as long as the reselection of step 308 locates a suitable cell within network 100, that is, as long as the path loss between mobile station M1 and at least one cell in network 100 remains below the path loss threshold C1.

When it is determined, at step 310, that loss of service from network 100 was detected during the reselection of step 308, the process moves to step 312. In steps 312–320, mobile station M1 performs cell reselection after loss of service according to the embodiment of the invention. The loss of service could occur if the user of mobile station M1 moved away from network 100 and is no longer within the coverage area of Cell A–Cell J. It also could occur, for example, if the user of mobile station M1 moves into a "dead area" of Cell H temporarily, and the strength of all BCCH carriers in the BA falls below C1 for a required amount of time. The latter case is the case in which the invention has particular advantage.

At step 312, mobile station M1 performs the loss of service measurement procedures on BCCH carriers that were included in the last BCCH carrier (BA) allocation received from network 100 before loss of service occurred, in order to maintain a measurement link with network 100. Mobile station M1 will continue to perform these measurements even though all BCCH carriers are received at a path loss greater than the path loss threshold for loss of service. The choice of which BCCH carriers to include in the loss of service measurements and the timing of the loss of service measurements may be the same as those of the reselection measurements performed in step 304. After each series of measurements of step 312 is completed, a determination is made at step 314, as to whether a BCCH carrier having a received signal level within the path loss criteria was detected in the loss of service measurements. If, at step 314, a determination is made that a BCCH carrier having a received signal level within the path loss criteria C1 was detected, the process moves to step 302, where the network of the detected BCCH carrier is selected, and steps 304–306 are repeated. Since the BCCH carrier detected at step 312 will have been detected from BCCH carriers of network 100, it will be a BCCH carrier of network 100, and network 100 will be selected again as it was upon initialization. Performing steps 312 and 314 according to the embodiment immediately after loss of service is determined allows mobile station M1 to determine whether service may be established without initiating the complete network search process.

If, however, at step 314, it is determined that no BCCH carrier having a received signal level within the path loss criteria was detected, the process moves to step 316, and a determination is made to see whether a power-saving network search timer has expired. The state of the network search timer is indicated by the state of a timer-expired flag. The timer-expired flag is initialized to 1 when loss of service is detected at step 310. The timer-expired flag set to 1 indicates that an initial network search should be performed after loss of service or that a network search should be performed because the network service timer has expired. The network service timer is started after an initial network search at step 318 has been done after a loss of service, and the timer-expired flag is set to 0 when the timer is started. Setting the timer-expired flag to 1 when loss of service is detected assures that a network search will be performed after loss of service without waiting for the network search timer to expire. The timer will run for a predetermined period of time, X seconds; and while the timer runs, the timer-expired flag will remain set to 0. Upon expiration of the network search timer, the timer-expired flag will be set to 1.

If a determination is made at step 316 that the timer-expired flag is set to 0, the network search timer has been started and has not expired, and the process returns to step 312 and repeats the loss of service measurements and the determination at step 314 as to whether a BCCH carrier having a received signal level within the path loss criteria was detected in the measurements of step 314. Steps 312 and 314 will then be repeated until a determination is made at step 314 that a BCCH carrier having a received signal level within the path loss criteria was detected at step 312, or until a determination is made at step 316 that the timer-expired flag is set to 1. The process then moves to step 318.

At step 318, the process performs a network search. In the embodiment, the network search of step 318 may be performed according to the GSM PLMN search process or GSM cell selection process by searching a predetermined number of RF channels to locate a BCCH carrier having a received signal level within the path loss criteria C1. Next, at step 320, it is determined if an available network was found at step 318. If a BCCH carrier meeting the path loss criteria is found, an available network, including the located BCCH carrier, is determined to exist and the process moves back to step 302. Steps 302–306 are then repeated as mobile station M1 initiates camping on the located BCCH carrier. Otherwise, if no BCCH carrier meeting the path loss criteria is found, the process moves back to step 312.

If the process moves back to step 312 after a network search is performed at step 318, steps 312–320 will be repeated until it is determined, at step 314, that a BCCH carrier having a received signal level less than the path loss criteria C1 was detected at step 312, or until it is determined at step 320 that an available network was found at step 318. Steps 312, 314 and 316 may be repeated at a rate relative to the rate of repetition of step 318 so that the measurement link with network 100 is up to date by at least a minimum amount of time. The measurements of step 312 may also be interleaved within the measurements performed in network search 318 to achieve this purpose.

The use of the measurement procedure at step 312 allows mobile station M1 to be quickly brought back into service in network 100, if the loss of service is temporary. Performing steps 312, 314 and 316 allows a measurement link that can be used for quick re-establishment of service to be maintained with network 100 while also performing a normal network search. After loss of service that is either temporary or long-term for a network, a mobile station can locate a BCCH carrier of a suitable cell efficiently.

The method and apparatus of the invention has application in all types of telecommunications systems in which the same type of temporary loss of service from a serving cell could occur. The teachings of this invention apply in general to maintaining a measurement link with a cell from which service has been lost in order to provide more efficient selection of a serving cell while also performing a network search.

Thus, while the invention has been particularly shown and described with respect to preferred embodiments thereof, it will be understood by those skilled in the art that changes in form or details may be made therein without departing from the scope and spirit of the invention.

What is claimed is:

1. A method of selecting a cell for a mobile station after loss of service in a telecommunications system, said method comprising the steps of:

detecting a loss of service from a selected network at the mobile station when in idle mode, wherein said loss of service indicates that the received signal level from each of a plurality of cells of said selected network has fallen below a predetermined threshold level and said selected network is not able to provide suitable service to the mobile station; and in response to detecting said loss of service:

performing, prior to performing a network search on any plurality of networks that includes networks other than said selected network, a measurement procedure on said plurality of cells of the selected network at the mobile station to maintain a measurement link with the selected network for possible re-establishment of service even though the received signal level from each of said plurality of cells has fallen below said predetermined threshold level, wherein said plurality of cells is selected for said measurement procedure on the basis of information received from said selected network before said loss of service occurred; and searching results of said measurement procedure determine if a suitable cell exists within said selected network, if the received signal level received from said suitable cell has risen above said predetermined threshold level subsequent to detecting said loss of service in said step of detecting, and if service may be re-established with said selected network without performing a network search on a plurality of networks that includes networks other than said selected network.

2. The method of claim 1, further comprising the steps of:

in response to not finding a suitable cell in said step of searching results of said measurement procedure;

performing a network search subsequent to performing said measurement procedure; and searching for a suitable cell to provide service to the mobile station using results of said network search.

3. The method of claim 2, wherein said said plurality of cells selected for said measurement procedure is selected on the basis of a list of channels received from a cell of the selected network before said loss of service occurred.

4. The method of claim 3, wherein said step of performing a network search is performed periodically, according to a timer, and is performed less frequently than said measurement procedure.

5. The method of claim 4, wherein said step of detecting a loss of service comprises performing a GSM-type reselection procedure, and said step of performing a network search comprises performing a GSM-type network search and GSM-type cell selection procedure.

6. The method of claim 5, wherein said step of detecting a loss of service comprises the step of detecting that a path loss between the mobile station and each cell of the selected network has risen above a predetermined value.

7. The method of claim 6, wherein said step of performing a measurement procedure further comprises synchronizing to each of a predetermined number of said plurality of cells and reading data on each of said plurality of cells.

8. An apparatus for selecting a cell for a mobile station after loss of service in a telecommunications system, said apparatus comprising:

a receiver, said receiver for performing a measurement procedure in response to receiving a first at least one control message, said receiver, further, for performing a network search in response to receiving a second at least one control message;

a memory, said memory for storing cell data on said selected network during the time the mobile station receives service from a selected network; and a processor coupled to said receiver and memory, said processor for detecting a loss of service at the mobile station from the selected network when in idle mode, wherein said loss of service indicates that the received signal level from each of a plurality of cells of said selected network has fallen below a predetermined threshold level and said selected network is not able to provide suitable service to the mobile station, and generating said first at least one control signal in response to detecting said loss of service, wherein said first as least one control signal directs said receiver to perform, prior to performing a network search on any plurality of networks that includes networks other than said selected network, said measurement procedure on said plurality of cells of the selected network for possible re-establishment of service based on said cell data stored in said memory, even though the received signal level from each of said plurality of cells has fallen below said predetermined threshold level, said processor further for searching results of said measurement procedure to determine if a suitable cell exists within said selected network, if the received signal level received from said suitable cell has risen above said predetermined threshold level subsequent to detecting said loss of service in said step of detecting, and if service may be re-established with said selected network without performing a network search on a plurality of networks that include networks other than said selected network.

9. The apparatus of claim 8, wherein said processor generates said second at least one control signal in response to not finding a suitable cell in said results of said measurement procedure, said second at least one control signal further directs said receiver to perform a network search, and wherein said processor searches for a suitable cell to provide service to the mobile station using results of said network search.

10. The apparatus of claim 9, wherein said cell data stored in said memory comprises a list of channels received from a cell of the selected network before loss of service occurred.

11. The apparatus of claim 10, wherein said first at least one control signal further directs said receiver to perform said network search periodically at a period set so that said network search is performed less frequently than said measurement procedure.

12. The apparatus of claim 11, wherein said processor detects said loss of service by performing a GSM-type reselection procedure and performs said network search by performing a GSM-type cell selection procedure.

13. The apparatus of claim 12, wherein said processor detects said loss of service by detecting that a path loss between the mobile station and each cell of the selected network has risen above a predetermined value.

14. The apparatus of claim 13, wherein said measurement procedure comprises synchronizing to each of a predetermined number of said plurality of cells and reading data on each of said plurality of cells.

\* \* \* \* \*